(12) United States Patent
Kouznetsov et al.

(10) Patent No.: US 6,832,366 B2
(45) Date of Patent: Dec. 14, 2004

(54) APPLICATION GENERATOR

(75) Inventors: Alexander Kouznetsov, Katy, TX (US); Ray Davis, Spring, TX (US); Heli Zhu Zhan, Katy, TX (US); Mark Sang Cho, Houston, TX (US); Edward Ray Hargraves, Deer Park, TX (US); Saqib Kasim, Sugarland, TX (US)

(73) Assignee: SimDesk Technologies, Inc., Houston, TX (US)

( * ) Notice: Subject to any disclaimer, the term of this patent is extended or adjusted under 35 U.S.C. 154(b) by 67 days.

(21) Appl. No.: 10/147,833

(22) Filed: May 17, 2002

(65) Prior Publication Data

US 2002/0194314 A1 Dec. 19, 2002

Related U.S. Application Data

(60) Provisional application No. 60/291,744, filed on May 17, 2001.

(51) Int. Cl.[7] ................................................. G06F 9/44
(52) U.S. Cl. ...................................................... 717/106
(58) Field of Search ............................. 717/106; 345/333

(56) References Cited

U.S. PATENT DOCUMENTS

| | | | | |
|---|---|---|---|---|
| 5,940,074 A | * | 8/1999 | Britt et al. ................... | 345/749 |
| 6,026,366 A | * | 2/2000 | Grube ........................... | 705/10 |
| 6,256,635 B1 | * | 7/2001 | Arrouye et al. ............. | 707/102 |
| 6,421,671 B1 | * | 7/2002 | Bryan et al. .................. | 707/10 |
| 6,601,095 B1 | * | 7/2003 | Duffield et al. ............. | 709/222 |
| 2002/0032768 A1 | * | 3/2002 | Voskuil ....................... | 709/224 |
| 2002/0059242 A1 | * | 5/2002 | Bryan et al. .................. | 707/10 |
| 2002/0112038 A1 | * | 8/2002 | Hessmer et al. ............ | 709/220 |
| 2002/0151366 A1 | * | 10/2002 | Walker et al. ................ | 463/42 |

* cited by examiner

*Primary Examiner*—John Chavis
(74) *Attorney, Agent, or Firm*—Woodard, Emhardt, Moriarty, McNett & Henry LLP

(57) ABSTRACT

A method and system are provided for the creation and use of custom-configured, database-backed, remotely accessible applications. Users of client devices (60) access an application generator server (30) via a network (50), providing configuration for a requested application. Through direct communication with the server (30), off-line use of an application or script, or by following a server-generated link, remote users execute the application subject to data type, formatting, and display characteristics and/or constraints provided in the application configuration information. Other applications hosted on the client device, server, or on another server (in communication with the application generator server) can exchange data with the generated application.

19 Claims, 5 Drawing Sheets

APPLICATION GENERATOR

REFERENCE TO RELATED APPLICATION

Priority is claimed to co-pending U.S. Provisional Patent Application No. 60/291,744, filed May 17, 2001.

BACKGROUND

The present invention relates to remotely executable computer programs. More specifically, the present invention relates to the creation and use of customized remote-access, database-backed applications. Present systems and techniques for development of remotely accessible applications suffer from limitations in power and ease of use.

There is thus a need for further contributions and improvements to the technologies of remote application generation and use.

SUMMARY

It is an object of the present invention to provide an improved system and method for generating and using database-backed applications.

This object and others are achieved by various forms of the present invention as disclosed herein, and as would occur to one skilled in the art given the present disclosure.

One form of the present invention provides an network-based user interface (UI) for generating an application. The application configuration information is stored in a database with the data used by the application itself. Links to the application can be generated for remote access by the author or others, and configuration information for the generated application can be exported for remote execution on a variety of client platforms using a script interpreter (engine) for converting the configuration file into user interface components, business rules, and mappings from the UI components to back-end (server-side) database fields.

DESCRIPTION OF THE ILLUSTRATED EMBODIMENTS

Figure 1:
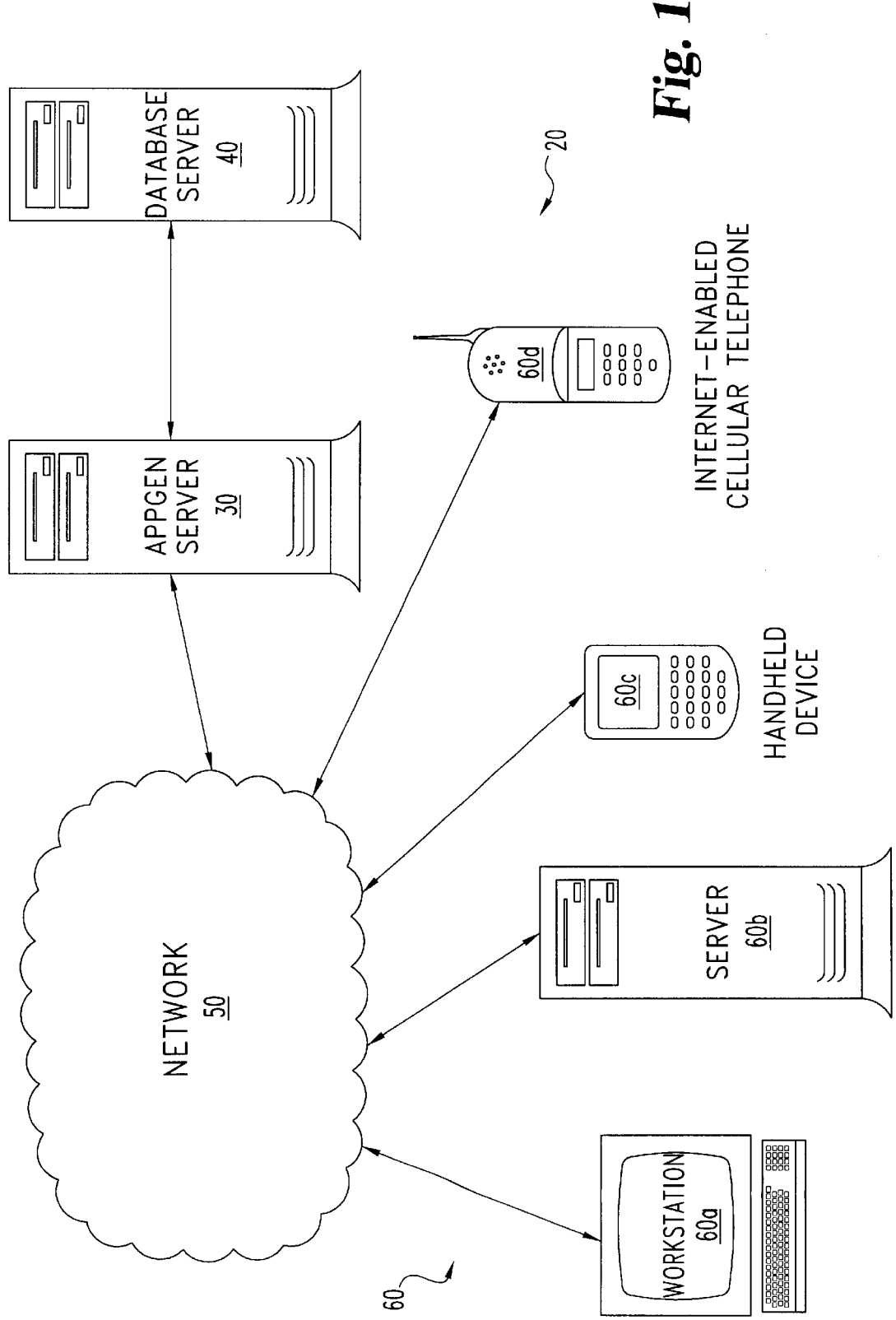
FIG. 1 is a block diagram of a remotely accessible application generation and use system according to one embodiment of the present invention.

For the purpose of promoting an understanding of the principles of the present invention, reference will now be made to the embodiment illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

Generally, the application generation and use system and methods described in relation to FIGS. 1-4 provide a simple and efficient way for users to create database-backed applications (i.e., applications that allow one or more users to enter, modify, view, and delete data that is stored in a database remote from the client device). These applications can be used as hosted applications by the author and others with access to the application generator ("APPGEN") server. To facilitate this access, the system may generate a uniform resource locator (URL), hyperlink, or other link usable by such users to access the application. In some forms, configuration information can be exported to a configuration file readable by a scripting engine or other client-side software on any of a variety of client devices to present the application's user interface, enforce business rules and validation requirements for entered data, generate output reports for data in the application, manage synchronization, and the like. These forms will be discussed in more detail below.

FIG. 1 illustrates an overall block diagram of system 20, comprising an application generator server 30, a database server 40, a network 50, and client devices including workstation 60a, server 60b, handheld device 60c, and internet-enabled cellular telephone 60d (the client devices are being generically referred to as "representative client" or "client device" 60). In this illustrated embodiment, any client device 60 can access application generator server 30 via network 50. In this embodiment, these connections are not necessarily constant (or even almost constant). For example, access via internet-enabled cellular telephone technology is somewhat more costly than land-line connections, so cellular connections are usually made and kept only as needed. The connection between application generator server 30 and database server 40, on the other hand, is preferably over a highly reliable medium, as is well known in the art. Generally, however, network 50 can be in the form of a Local Area Network (LAN), Wide Area Network (WAN) such as the Internet, or other network type as would occur to those skilled in the art.

Generally speaking, client devices 60 connect via network 50 to application server 30, which creates an application using configuration information provided by the users of the client devices 60. The application configuration information is stored in database server 40 for future use. The author or other users of client devices 60 then access the application on APPGEN server 30, adding, using, and deleting application data as desired. Database server 40 stores this data for later editing, viewing, and deleting, as directed by users.

Figure 2:
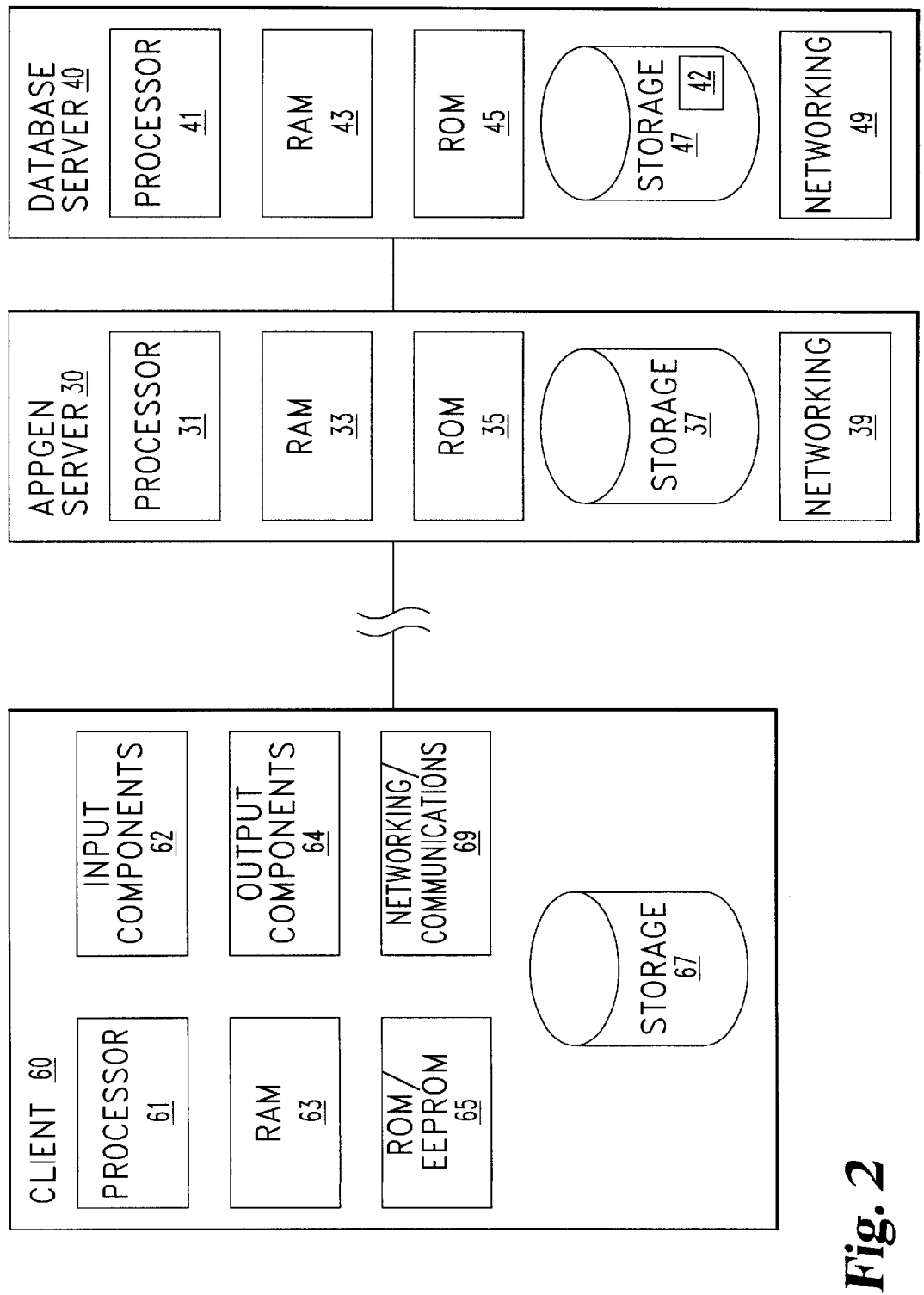
FIG. 2 is a block diagram of components in a representative client, application generator server, and database server in one embodiment of the present invention.

Turning now to FIG. 2, with continuing reference to FIG. 1, components of representative client 60, APPGEN server 30, and database server 40 are shown. Representative client 60, in this example, has processor 61, one or more input components 62, random access memory (RAM) 63, one or more output components 64, read-only memory (ROM) and/or electrically erasable, programmable read-only memory (EEPROM) 64, storage 67, and one or more networking and communications components 69. It should be noted that representative client 60 can include more than one processor or CPU and one or more types of storage, where memories 63, 65, and 67 are representative of the one or more types. Processor 61 can be comprised of one or more components configured as a single unit. Alternatively, when of a multi-component form, processor 61 can have one or more components located remotely relative to the others. One or more components of processor 61 can be of the electronic variety comprising digital circuitry, analog circuitry, or both. In one embodiment, processor 61 is of a conventional, integrated circuit microprocessor arrangement, such as one or more PENTIUM III or PENTIUM 4 processors supplied by INTEL Corporation, or one or more 680x0 microprocessors supplied by MOTOROLA, Inc.

Memory components 63, 65, and 67 can include one or more types of solid-state electronic memory, magnetic memory, or optical memory, just to name a few. By way of non-limiting example, memories 63, 65, and 67 can include solid-state electronic RAM, Sequentially Accessible Memory (SAM) (such as the First-In, First-Out (FIFO) variety or the Last-In First-Out (LIFO) variety), Programmable Read-Only Memory (PROM), Electrically Programmable Read-Only Memory (EPROM), or EEPROM; an optical disc memory (such as a DVD or CD-ROM); a magnetically encoded hard disk, floppy disk, tape, or cartridge media; or a combination of any of these memory types. Also, memories 63, 65, and 67 can be volatile, nonvolatile, or a hybrid combination of volatile and nonvolatile varieties.

One or more operator input components 62 may be included, such as a keyboard, mouse, track ball, light pen, and/or microphone, to name just a few representative examples. Also, one or more output components 64 can be included, such as a monitor or other viewing device, or loudspeaker(s). One or more networking/communications components 69 may include one or more network interface cards (NICs), other cards, interfaces, or other devices capable of providing connectivity through one or more wired or wireless networks, including network 50, as known in the art.

In this embodiment, APPGEN server 30 includes processor 31, RAM 33, ROM 35, storage 37, and one or more networking/communications components 39, which provide the same functionality as corresponding components 61, 63, 65, 67, and 69, respectively, though they may not comprise identical components to the corresponding parts of any particular client 60. Likewise, database server 40 includes processor 41, RAM 43, ROM 45, storage 47, and one or more networking/communications components 49, which also provide analogous functionality to corresponding components 61, 63, 65, 67, and 69, respectively, but may or may not comprise identical components to the corresponding portions of representative client 60 or APPGEN server 30.

Figure 3:
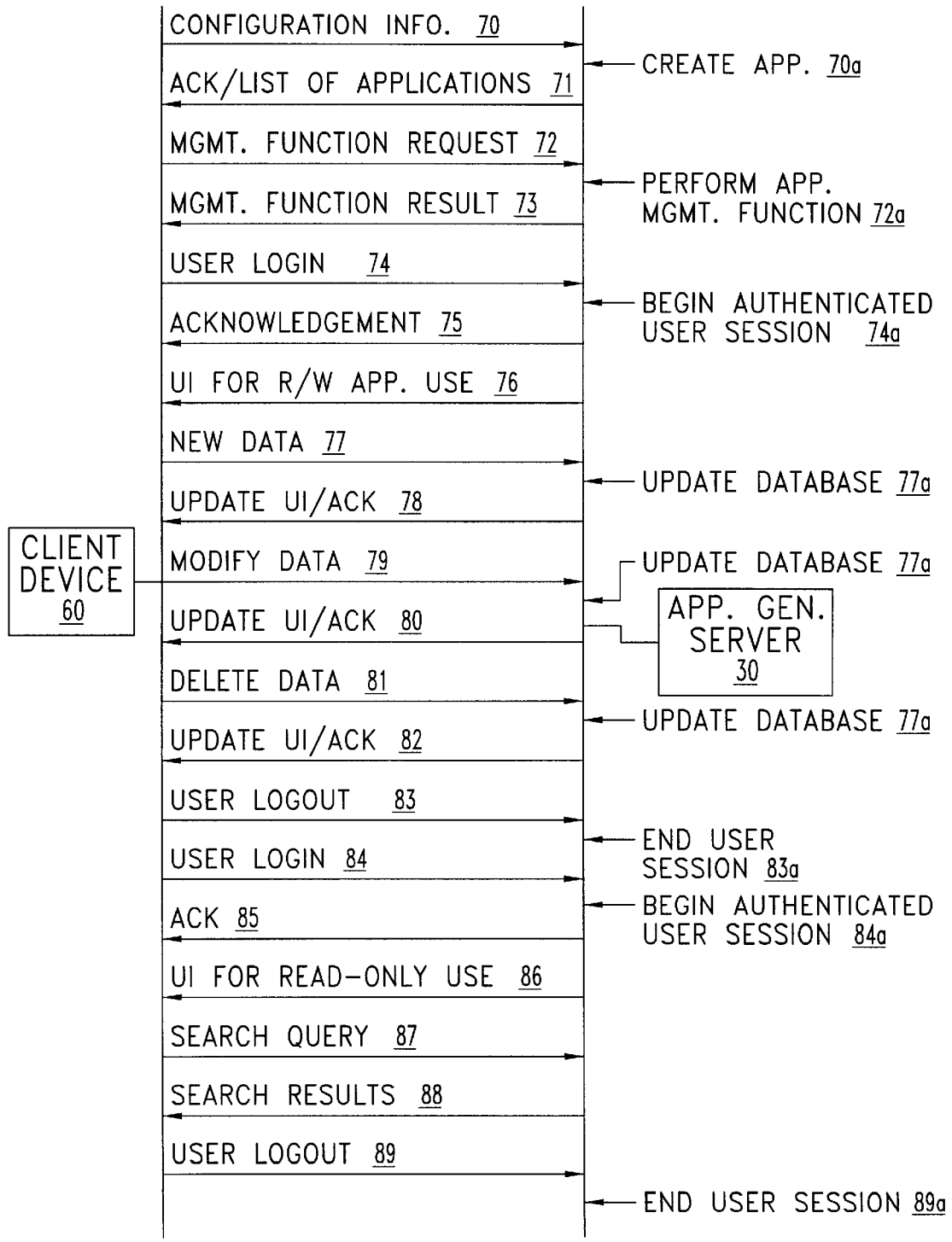
FIG. 3 is a signal map of communications between a representative client device and the application generator server according to one embodiment of the present invention.

One exemplary series of signals sent between representative client device 60 and APPGEN server 30 is illustrated as a non-limiting example in FIG. 3, and will now be discussed with continuing reference to elements of FIG. 1. In this example, configuration information signal 70 from the client 60 to the APPGEN server 30 indicates user-selected configuration parameters for an application that the user desires to have generated. This information is entered by the user using one or more methods known in the art, such as by using a client-side application or a series of HTML forms. The user interface that is provided in this example for entry of configuration information is preferably adapted for the type of client device 60 making the connection, and preferably provides the user with several valid options for configuration of data fields to be used by users of the application, and manipulations of that data that the creating user wishes to allow. Other configuration information that may be present in this exemplary embodiment includes: a first group of usernames for users who should be permitted to view, modify, and delete the application's data (read-write access), a second group of usernames for users who should be permitted only to view the data (read-only access), user interface configuration (including user interface elements such as buttons, lists, labels, and input elements, with their appearance, characteristics, and positions), and the like. This configuration information is stored in database 42, which effectively makes available a new application having the requested configuration. That creation event (70a) is acknowledged, and a list of available applications is provided on response signal 71.

The creator, or owner, of the new application submits a new authenticated management function request on signal 72. This function may include, for example, editing, revising, expanding, or deleting all or part of the configuration information that was provided in signal 70. The authentication of this request might include or use any suitable user- and/or device-authentication technique known in the art, such as HTTP-based "basic" or "digest" authentication, form-based username/password input, biometric techniques, and the like. If APPGEN server 30 determines that the request for performing a management function was made by a user authorized to perform that operation (or "those operations", depending on the granularity of the authorization scheme), it performs (72a) the requested application management function (updating database 42 accordingly) and provides the result of that performance and a UI update to the client on signal 73.

Still later, the owner authenticates himself or herself using any available technique (see the above discussion of signal 72), sending a login signal 74 to the server 30. APPGEN server 30 then starts (74a) an authorized user session. Using acknowledgement signal 75, server 30 acknowledges to client device 60 that the server login was successful. APPGEN server 30 then transmits signal 76 to client device 60. Signal 76 communicates information to client device 60 to enable presentation of a user interface usable by the user to perform viewing, editing, reporting, and deleting operations on the application's data. With this user interface, the authenticated user sends new data to APPGEN server 30 on signal 77. The user interface presented on client device 60 preferably enforces business logic rules on input data as the user enters it. These may include, for example, presentation rules, user interface fields that present values based upon applying given formulas to other fields, display styles dependent on data fields or calculated values, and the like), forms entry rules (size limits for fields, data formatting, requirements, and the like), database update rules, and data validation rules. When it receives the new data, APPGEN server 30 updates (77a) database 42 via database server 40, then acknowledges the change, updating the user interface on client device 60 via signal 78.

In another operation, the user of client device 60 modifies existing application data. When the modifications have passed the validation and update criteria applied by the user interface, client device 60 sends a "modified data" signal 79 to APPGEN server 30. Again, APPGEN server 30 validates the modification and updates (77a) database 42 accordingly. APPGEN server 30 responds with signal 80, which again updates the user interface on client device 60 and acknowledges the change.

In still another transaction, the user of client device 60 deletes existing application data. Following the usual validity and update checking, client device 60 sends signal 81 as a request for APPGEN server 30 to delete data from database 42. After its own validation process successfully completes, APPGEN server 30 updates (77a) the database 42 and responds with signal 82, acknowledging the change and updating the user interface on client device 60.

Should any of the validity or update checks fail, error messages and/or prompts for corrections may be presented to the user via client device 60 using means and methods known in the art. When the user's modifications are complete, he or she logs out of the application, which event the client device 60 signals to APPGEN server 30 by sending logout signal 83. APPGEN server 30 ends (83a) the authenticated user session and may optionally update (not shown) the user interface on client device 60 to reflect the successful termination of the session.

When a user in the group of users who are only permitted read-only access logs into APPGEN server 30 via user login signal 84, APPGEN server 30 begins (84a) an authenticated user session, acknowledging the same via signal 85, and presenting a user interface (different from the user interface described by signal 76) for read-only use of the application via signal 86. This user interface provides a means for the user to view (perhaps a limited portion of) the data associated with the application. With this user interface, the user of client device 60 can submit a query to retrieve a particular view of all or selected portion of the application's data via search query signal 87. APPGEN server 30, in communication with database server 40, retrieves the relevant data from database 42 and provides information needed to construct the requested view via search result signal 88. When the user has finished querying and viewing the data, the user logs out of the application, causing client device 60 to send user logout signal 89 to APPGEN server 30 which ends (89a) the authenticated user session.

Figure 4:
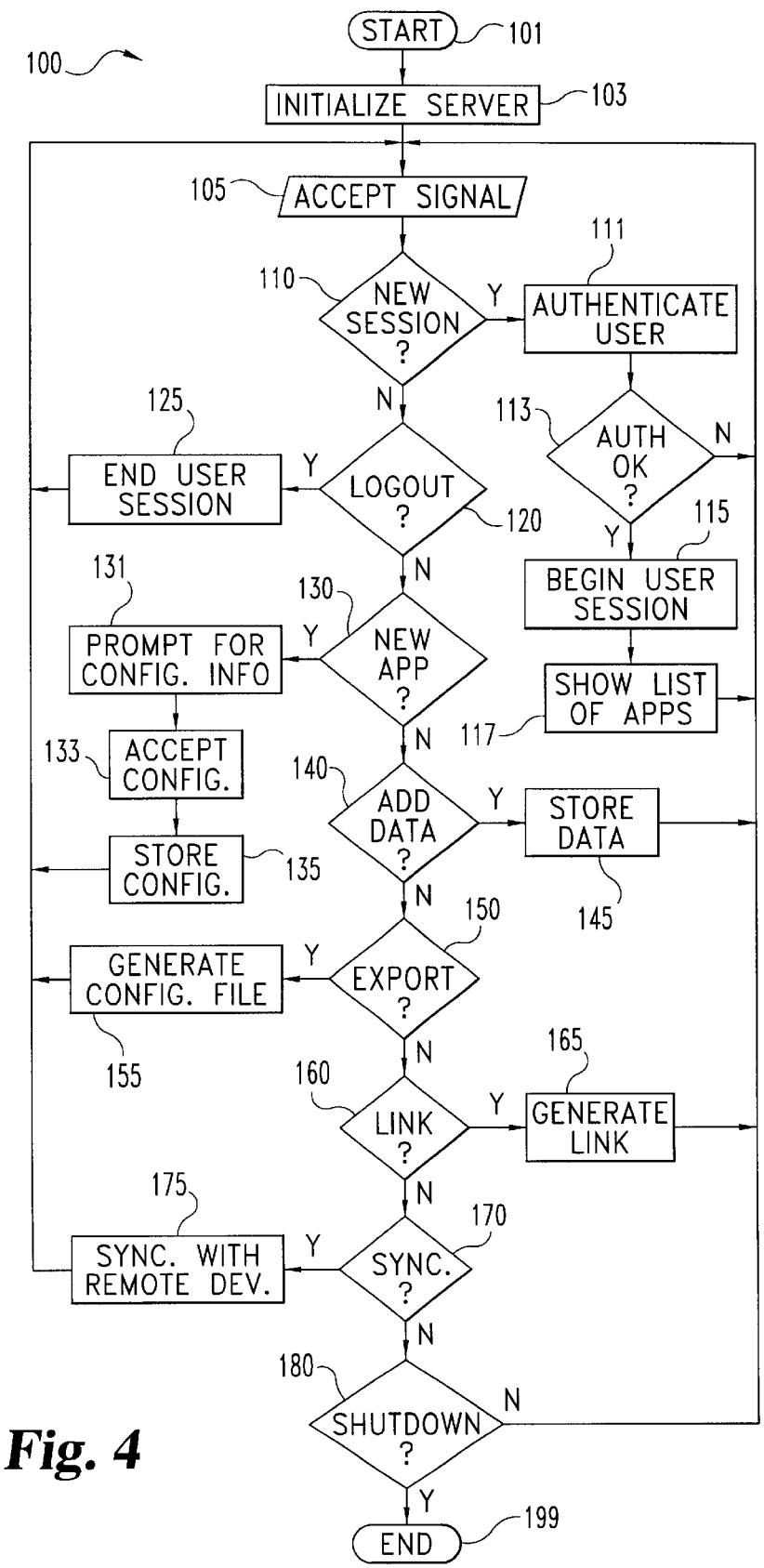
FIG. 4 is a flowchart describing operation of an application generator server according to one embodiment of the present invention.

The steps performed by some embodiments of the present invention will now be described in relation to FIG. 4 with reference to elements of FIG. 2. Process 100 begins at START point 101, and a server is initialized at block 103. This initialization prepares the server for receiving connections from remote devices, checks connectivity with one or more databases to be used by the server for storing and retrieving applications and application data, and performs other initialization tasks as would be done by those skilled in the art. The server then waits for incoming connections from remote devices.

The server accepts an incoming signal at input block 105. In various exemplary embodiments, this input signal may take the form of an HTTP request, remote procedure call, asynchronous message arrival, or other signal as will occur to one skilled in the art. Then, generally, the server determines the type of signal that has arrived, then takes appropriate action and/or provides an appropriate response as will be discussed below. In various embodiments, each incoming signal may be processed in a separate thread of execution of processor 31, in a single thread in an event or polling loop, or using other techniques as would occur to one skilled in the art.

At decision block 110, it is determined whether the incoming signal indicates a request by the user of a remote device for authenticated access to one or more applications at the server. If so (affirmative result at decision block 110), the server authenticates the user as discussed above at block 111. If the authorization process fails (negative result at decision block 113), the server returns to waiting for an incoming signal (a "wait state" proceeding block 105), optionally responding with a signal (not shown) indicating a failed authentication attempt using techniques known in the art. If the authentication is successful (affirmative result at decision block 113), the server begins a new user session at block 115, as is known in the art. This process typically involves assignment of a session identifier that is stored at the server and submitted with each request from the client during the session. The server then responds to the incoming signal at block 117 by providing information sufficient to show the user (via an output component of client 60) a list of available applications, then returns to its wait state.

If the incoming signal is not a request for a new authenticated session (negative result at decision block 110), the server determines whether the incoming signal is a request to end that session, or "logout" of the server (decision block 120). If so (affirmative result at decision block 120), the server releases the resources tied to the user session and invalidates the session identifier at block 125. The server then returns to its wait state.

If the incoming signal is not a request to end the login session (negative result at decision block 120), the server determines whether the incoming signal is a request to create a new application (decision block 130). If so (affirmative result at decision block 130), the server prompts the user at block 131 for configuration information for the new application. The server accepts that configuration information at input block 133 and stores it in the system database 42 at block 135. As discussed above, this prompt/accept/store procedure may comprise providing one or more HTML forms, iteratively validating and accepting additional configuration information, limiting input to valid characters and the like.

The configuration acquisition process (blocks 131, 133, and 135) will typically obtain from the user one or more names and data types for fields to be established in the application database, field lengths and validation rules for data input, and the like. In some embodiments, the configuration information also (explicitly or implicitly) specifies default values for new records, display formats (currency, date, time, exponential notation, and the like), a flag indicating whether a particular field may be edited by users, and/or a default UT form for users in each of the administrative, manager, and user groups. The configuration information may include references to one or more preconfigured data types, custom data types, or a combination of the two. It may be initially derived as a duplicate copy of an existing application configuration, or may be created from scratch. Once the configuration information has been accepted and stored, the server returns to its wait state.

If the input signal is not a request to generate a new application (negative result at decision block 130), the server determines whether the input signal is a request to add data to an existing application (decision block 140). If so (affirmative result at decision block 140), the server validates and stores the new data at block 145, updating the user interface on the client device to reflect acceptance of the data. The server then returns to its wait state.

If the incoming signal is not a request to add new data (negative result at decision block 140), the server determines whether the incoming signal is a request to export the configuration information for an application (decision block 150). If so (affirmative result at decision block 150), the server generates a configuration file and transmits that file to the client device. The server then returns to its wait state. In this embodiment, the configuration file can be interpreted by a client-side scripting engine to present a user interface tailored to the exported application, enabling users of client devices to "execute" the application while disconnected from the server, including authentication, UI, and adding to, deleting, editing, and viewing the application's data. The user interface also allows the user of the client device to synchronize such remotely modified data with the application data on the server (see discussion of block 175, below). The configuration file may take the form of a database file, XML (or an extension thereof) file, a script executable by a general-purpose scripting engine, or other forms that would occur to one skilled in the art.

If the incoming signal is not a request for the export of the application (negative results at decision block 150), the server determines whether the incoming signal is a request to generate a link to the application (decision block 160). If so (affirmative result at decision block 160), the server generates a link, such as a text URL, a data file containing a URL, an executable program that establishes a specified connection, or other forms as would occur to one skilled in the art. The link may contain, in an encoded or unencoded form, an identifier for the specified application, an identifier for the user generating the link, the level or bounds of access to be permitted to those using the application via the link, authentication parameters (such as a user or group identifier, specific password to use, and acceptable authentication protocol(s)) for using the link, a time limit or usage count limit on the link, and/or other elements in the link. Alternatively or additionally, one or more of these link data elements may be stored in the database 42 and be referred to by a database key in the generated link. Once the link is generated and made available or sent to the client device, the server returns to its wait state.

If the incoming signal is not a request to generate an application link (negative result at decision block 160), the server determines whether the incoming signal is a request to synchronize remote data with the application data stored at the server (decision block 170). If so (affirmative result at decision block 170), the server proceeds to synchronize data at the remote device with the server-side application data at block 175. Synchronization may proceed using any appropriate method. When synchronization is complete, the server returns to its wait state.

If the incoming signal is not a request for synchronization (negative result at decision block 170), the server determines whether the incoming signal is a shutdown command (decision block 180). If not (negative result at decision block 180), the server takes a default action, such as returning to its wait state, displaying an error message at the client device (not shown), or other action as would occur to one skilled in the art. If the incoming signal is a shutdown command (affirmative result at decision block 180), the server shuts down and process 100 ends at END point 199.

A further embodiment of the present invention will now be discussed in relation to system 200 in FIG. 5. Client 260 accesses a hosted application (such as, for example, a word processing or spreadsheet application) on application server 220, which is operated by an application service provider (ASP) 210 as is well known in the art. Application server 220 is in communication with application generator server 230, which is also operated by ASP 210. In this embodiment, tools are provided for the owners and/or users of generated applications to create data entry forms that are linked to the application, but usable via applications hosted on application server 220 to add, edit, view, and/or delete live data (and/or an off-line copy thereof) for the generated application. Likewise, tools are provided to generate reports of data from the generated application in a form directly usable, viewable, and manipulatable in the hosted application. Data entered and/or modified using forms on a hosted application may be stored locally (on the client) and later synchronized with the generated application database, or may operate in a pass-through manner to update the generated application data in real time as revisions are made using the form.

Figure 5:
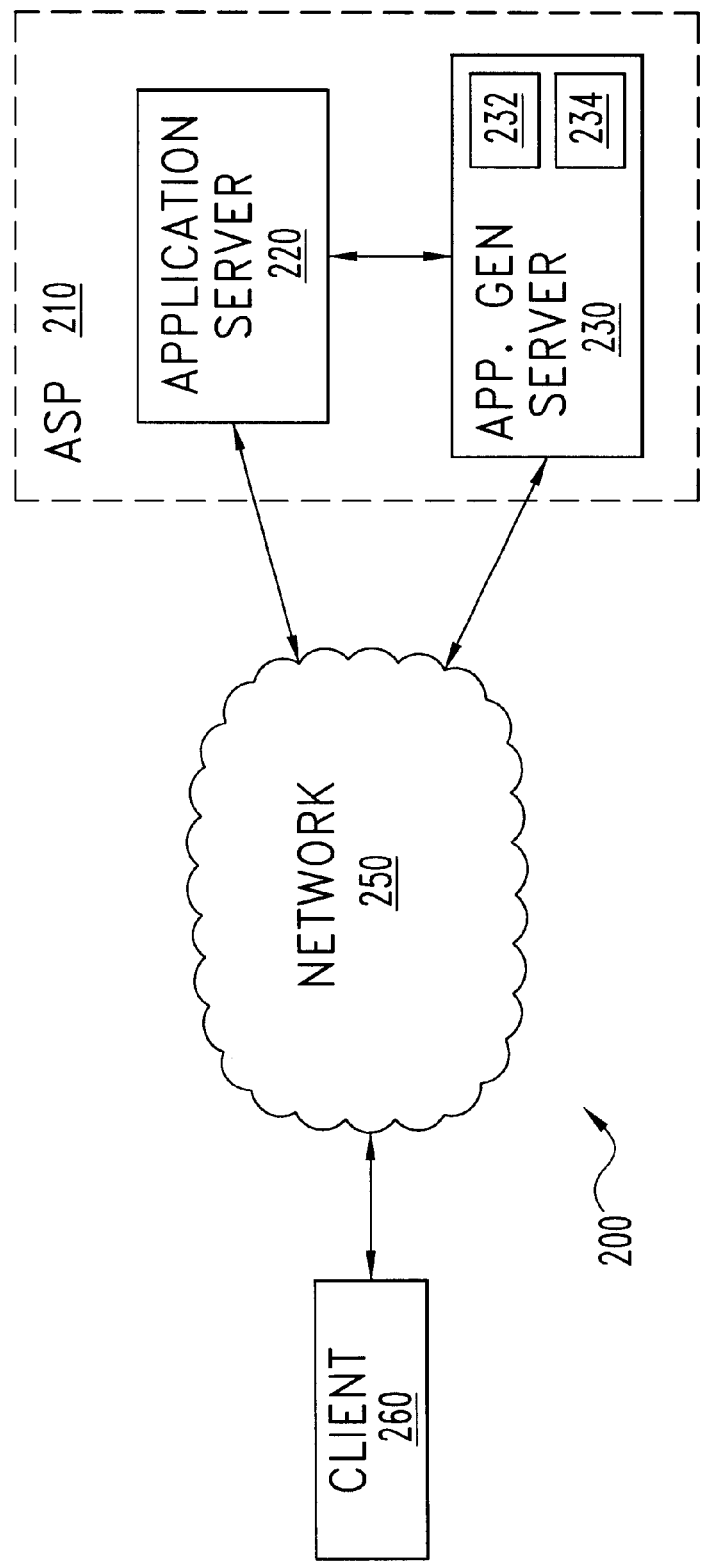
FIG. 5 is a block diagram of a system for remotely using hosted productivity applications in conjunction with one or more generated applications.

In an alternative to the system shown in FIG. 5, the productivity application(s) and/or the documents they operate upon are resident on the client, but include links to the data of the generated application. In some such embodiments, native networking and database capabilities of the client-side productivity application are leveraged to provide connectivity to the generated application's data. In other such embodiments, the client-side productivity application is enhanced to enable access to that data.

While aspects of the present invention have been discussed in some detail, it will be understood by those skilled in the art that a wide variety of variations are available without undue experimentation. For example, various embodiments may take advantage of one or more of the following variations: any wire protocol suitable for the devices in a system may be used, and additional networks and/or connections may be provided; Database functionality in relation to database 40 (FIGS. 1 and 2) may be combined with functionality described in relation to APPGEN server 30 for execution on a single computer system, or the functionality described above for those devices may be distributed among several computing devices; a proxy server can be inserted between network 50 and APPGEN server 30 to redirect incoming queries based on their source, content, or other characteristics, or circumstances; load balancing techniques may be applied to the server-side processing and/or routing of signals through the system; user and/or device identities may be exchanged explicitly (as discussed above) or implicitly based on network addresses, application identifiers, or other data elements; and provisions can be made for importing user data from external files and/or databases using methods well known in the art.

In another embodiment, the exported configuration file is stored on the server (or generated in real time), but is executed on the client upon request using a browser plug-in or other agent. Such user agents often provide additional input/output and/or processing capabilities not natively present in a given user environment, and can be leveraged in the present invention to remove some of the resource load from the client device relative to the script-reading embodiment described above.

In still another embodiment, data can be exchanged between generated applications. For example, with reference to FIG. 5, an "address book" application 232 might be linked with a "product shipments" application 234 on APPGEN server 230. Invoices and shipping labels created using product shipments application 234 can retrieve current name and address information from address book application 232; likewise, address book 232 can display data regarding the latest shipment to a particular contact, for example.

In still another embodiment, with reference to FIG. 1, APPGEN server 30 may present a "web service" interface for use by client devices 60 not presently being controlled by a user. Automated data exchange between applications on client devices can be maintained without user intervention through automated data exchange and other web service methods using techniques known in the art.

All publications, prior applications, and other documents cited herein are hereby incorporated by reference in their entirety as if each had been individually incorporated by reference and fully set forth.

While the invention has been illustrated and described in detail in the drawings and foregoing description, the same is to be considered as illustrative and not restrictive in character, it being understood that only the preferred embodiments have been shown and described and that all changes and modifications that would occur to one skilled in the relevant art are desired to be protected.

What is claimed is:

1. A method of generating computer applications, comprising:

providing access to a server;

receiving at the server from a first remote device a first set of one or more related request signals that together indicate a request for generation of a first database-backed computer application, the one or more related request signals comprising first application configuration information;

creating and configuring a first computer application remote from said first remote device based on the first application configuration information;

receiving at the server from said first remote device a data submission signal that indicates a request to add first data to the first computer application; and adding the first data to the first remote computer application in response to the data submission signal.

2. The method of claim 1, wherein:

said creating and configuring comprises storing at least a portion of said first application configuration data in a first database; and said adding comprises storing said first data in said first database.

3. The method of claim 1, further comprising:

receiving at the server from a second remote device a second set of one or more related request signals that together indicate a request for generation of a second database-backed computer application, the one or more related request signals comprising second application configuration information;

creating and configuring a second computer application based on the second application configuration information;

receiving at the server a data submission signal that indicates a request to add second data to the second computer application; and adding the second data to the second computer application in response to the data submission signal.

4. The method of claim 1:

wherein said configuration information further comprises access information for each of a plurality of user groups, and further comprising limiting access to the first computer application, based on the access information, for users in at least one of the plurality of user groups.

5. A system, comprising:

a database comprising one or more tables, each table having zero or more records, containing:

configuration information for a first application comprising a first set of one or more records in said one or more tables, and configuration information for a second application comprising a second set of one or more records in said one or more tables; and an application generating means for reading particular configuration information for a selected application from one or more records in said database, and for presenting a user interface based on the particular configuration information, wherein said user interface performs at least one of displaying to a remotely located user data associated with said selected application, and accepting new data from said remotely located user for storage associated with said selected application.

6. The system of claim 5, further comprising an application management means for providing one or more authenticated users the ability to modify said particular configuration information.

7. The system of claim 6, wherein:

a first group of users can be authenticated for management of said first application, a second group of users can be authenticated for management of said second application, and said first group and said second group are different.

8. The system of claim 7, wherein said first group consists of a single user.

9. The system of claim 5, further comprising a means for exporting at least a portion of said particular configuration information to a file.

10. A system, comprising:

a first computer providing access via a user interface to a second computer hosting at least one computer application; and a database associated with said second computer;

wherein said user interface comprises a data form that enables manipulation of data in said database by said first computer via said second computer for use by said at least one computer application.

11. The system of claim 10, wherein said first computer is associated with said database.

12. The system of claim 10, wherein said access is read-only.

13. The system of claim 10, wherein said access is read-write.

14. A system, comprising:

a server in communication with a database having at least one table with at least two fields;

a processor remotely located from said database and said server and in communication with said server; and a storage medium in communication with said processor and encoded with programming instructions executable by said processor to:

generate a user interface;

accept user-input data through said user interface;

apply business rules to said user-input data;

define a relationship between at least a first portion of said user-input data and said at least two fields;

wherein a configuration file includes information usable by said processor in accordance with said programming instructions to define said user interface, said business rules, and said relationship.

15. The system of claim 14, wherein said configuration file is created by said server.

16. The system of claim 14, wherein at least a second portion of said user-input data is stored in non-volatile memory local to said processor while said processor is not in communication with said database.

17. The system of claim 16, wherein said second portion of said user-input data is synchronized with data in said at least two fields of said database.

18. The system of claim 14, wherein said database shares memory and processing resources of said server.

19. The system of claim 14, wherein said database uses memory and processing resources not accessible to said server.

* * * * *